United States Patent [19]

Maeda et al.

[11] 4,415,968

[45] Nov. 15, 1983

[54] DIGITAL DATA PROCESSING SYSTEM WITH ASYNCHRONOUS SENSING UNITS

[75] Inventors: Koji Maeda; Tadahiro Goda, both of Kobe, Japan

[73] Assignee: Mitsubishi Denki Kabushiki Kaisha, Tokyo, Japan

[21] Appl. No.: 247,457

[22] Filed: Mar. 25, 1981

[30] Foreign Application Priority Data

Mar. 31, 1980 [JP] Japan .................................. 55-42647

[51] Int. Cl.³ ...................... G06F 15/46; G05B 21/02
[52] U.S. Cl. ............................ 364/178; 340/825.06; 364/139; 364/184; 364/492
[58] Field of Search ............... 364/178, 179, 184, 138, 364/139, 172, 200 MS File, 900 MS File, 492, 483; 318/636; 361/78-87; 340/825.06, 825.07, 825.1, 825.14, 825.2, 825.22

[56] References Cited

U.S. PATENT DOCUMENTS

| | | | |
|---|---|---|---|
| 3,976,981 | 8/1976 | Bowden | 364/178 X |
| 4,190,823 | 2/1980 | Leichle | 364/178 X |
| 4,277,832 | 7/1981 | Wong | 364/178 X |
| 4,308,585 | 12/1981 | Jordan | 364/179 X |

*Primary Examiner*—Joseph F. Ruggiero
*Attorney, Agent, or Firm*—Sughrue, Mion, Zinn, Macpeak and Seas

[57] ABSTRACT

A digital data processing system in which system parameters in an electric power system such as current or voltage are sampled at predetermined time intervals and converted into digital data by analog-to-digital converter units. The sampling frequency is made higher than the expected frequency of variation of these parameters. Sensing units located remotely from one another sample these parameters at rates which are asynchronous between sensing units. The data transmitted from the various sensing units is sent to a central processing unit where the received signals are sampled synchronously and then processed in order to provide protection for the electric power system.

3 Claims, 3 Drawing Figures

DIGITAL DATA PROCESSING SYSTEM WITH ASYNCHRONOUS SENSING UNITS

BACKGROUND OF THE INVENTION

The present invention relates to a digital data processing system in which, in order to protect an analog system such as an electric power system, various parameters such as current or voltage representative of the system are sampled at predetermined time intervals and converted into digital data which is applied to a digital processing device for processing. From the results of the data processing, the conditions of the system are determined and control outputs are provided according to the conditions thus determined to protect the system.

In a conventional on-line control system using a digital processing device, a plurality of sensing units with current transformers (CT) or voltage transformers (PT) are provided to input system data to a central processing unit. FIG. 1 is a block diagram of a conventional system of this type where data simultaneously provided at the sensing units is sampled and converted into digital data and applied to and processed by the digital processing device. A specific application of this system arrangement to an electric power system will be described.

In FIG. 1, reference numerals 1 and 2 designate spaced-apart sensing units in an electric power system which may, for instance, be at installation points of current transformers (CT) or voltage transformers (PT). By way of example, if current is the sensed parameter, the sensing units 1 and 2 will include sensors 11a and 11b, namely, current transformers (CT); analog-to-digital converter units 12a and 12b including analog filters which sample the output analog current outputs of the sensors 11a and 11b at predetermined time intervals to convert them into digital data; sample-and-hold circuits and A/D (analog-to-digital) converters; transmitters 13a and 13b; control circuits 14a and 14b for synchronizing the sampling timing of the two analog-to-digital converter units 12a and 12b; and receivers 15a and 15b which receive master clock signals from an outside source and drive the control circuits 14a and 14b, respectively.

A master clock signal generating circuit 18 including an oscillator and a frequency division circuit is provided at one position in the electric power system to generate a master clock signal which is applied to all of the sensing units to synchronize the sampling timing. Transmitters 17a and 17b are provided to transmit the master clock signal. The sampling signal from the master clock signal generating circuit 8 is applied through the sample signal transmitters 17a and 17b and transmission lines 20 to the sensing units 1 and 2, respectively, where it is received by the sampling signal receivers 15a and 15b and is then applied to the control circuits 14a and 14b, respectively.

The sensors 11a and 11b are provided to detect the designated system parameters. The analog parameters sensed by the sensors 11a and 11b are applied to the analog-to-digital converter units 12a and 12b where they are sampled simultaneously with the sampling signals from the control circuits 14a and 14b and are converted into digital data which is transmitted to a digital processing device 19 through the transmission lines 20 by the data transmitting devices 13a and 13b. The digital data is received by data receiving devices 16a and 16b and then applied to the digital processing device 19 for processing. Thus, the digital processing device receives and transmits the sample values at the same time in the sensing units 1 and 2.

The above-described system is disadvantageous in the following points: Since the sampling signal is supplied to the sensing points from the digital processing device side, the physical arrangement of the system is necessarily large and also the number of components is considerably large which makes the reliability of the system undesirably low.

SUMMARY OF THE INVENTION

In order to overcome the aforementioned drawbacks, the invention provides a digital data processing system of the type which can be used to protect a large-scale analog system such as an electric power system wherein variable parameters such as current or voltage representative of operational states of the system are sampled with a plurality of sensing units located remotely from one another using clock signals in each sensing unit which are asynchronous from unit to unit. Analog-to-digital converter units in each of the sensing units convert a sensed parameter into digital data at a rate which is higher than expected variations with time of the sensed parameters to provide digital data representative thereof. The digital data from each sensing unit is transmitted at a high rate to a data processing unit including a data processing device such as a digital computer. The data from the various sensing units is synchronously sampled and inputted to the digital processing device through a buffer unit which may be implemented with a random access memory. The digital processing device processes this data using the results to protect the analog system.

DESCRIPTION OF THE PREFERRED EMBODIMENTS

Figure 1:
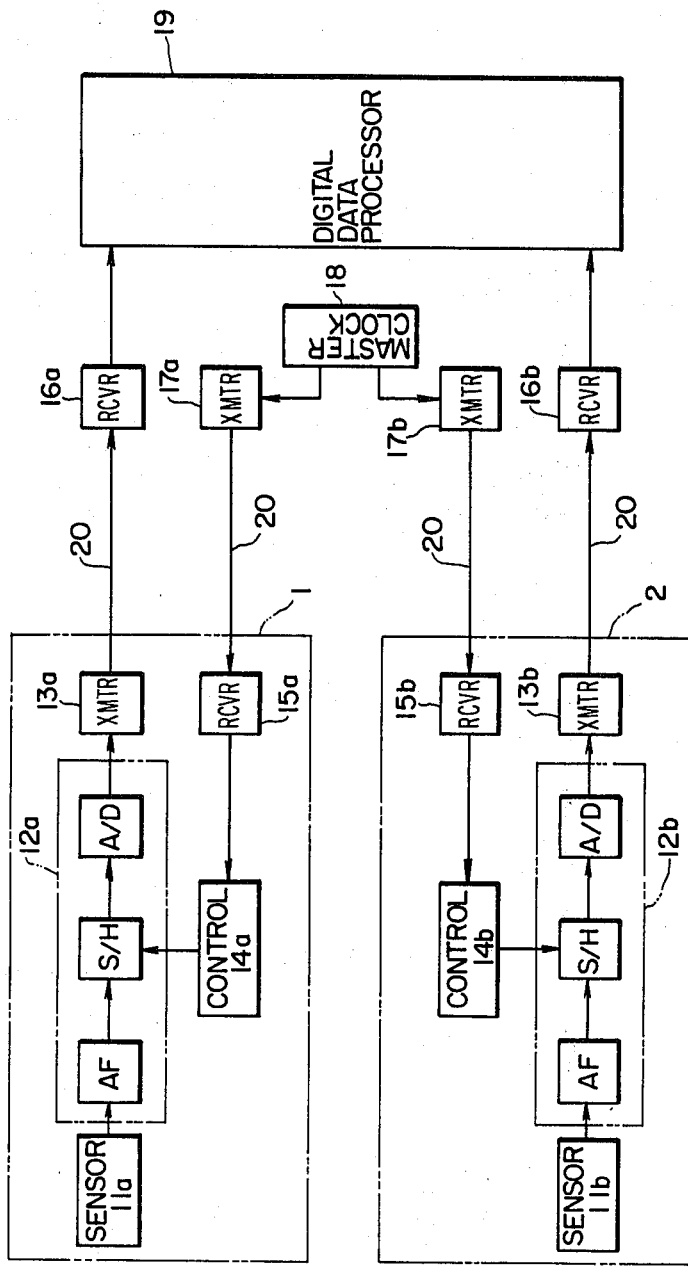
FIG. 1 is a block diagram of a conventional processing system of the same general type to which the invention belongs.

A preferred embodiment of the invention as applied to an electric power system will be described with reference to FIG. 2.

Using a sampling signal generated by a timing generator 29a, a signal representing a signal parameter outputted by a sensor 21a, which is similar in arrangement to the above-described sensor 11a, is sampled by an analog-to-digital converter unit 22a and there converted into digital data. The converter unit 22a performs the same general function as the above-described converter unit 12a in FIG. 1 although a faster response rate is required for the system of FIG. 2. The timing generator 29a in a sensing unit 3 and a timing generator 29b in a sensing unit 4 produce sampling signals of the same frequency although it is not necessary that these sampling signals be synchronous with each other. The frequency of the sampling signals must be greater than the expected frequency of variations in the system parameters being monitored.

Figure 2:
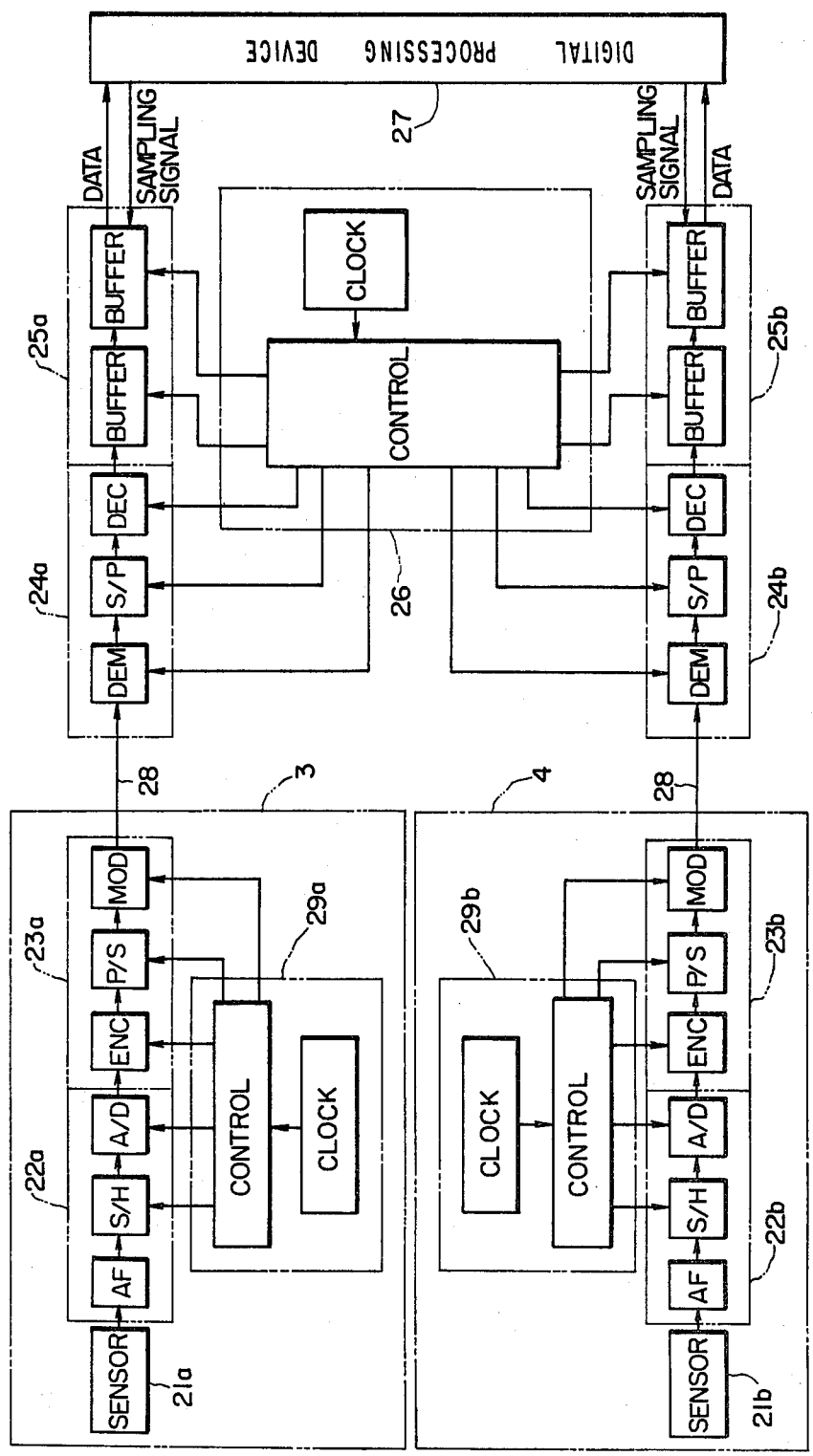
FIG. 2 is a block diagram of a processing system constructed in accordance with the invention.

The difference between the timing generators 29a and 29b of FIG. 2 and the control circuits 14a and 14b of FIG. 1 resides in that each of the timing generators has its own sampling signal generating clock circuit and its own frequency division circuit. Thus, each of the timing generators 29a and 29b performs separately the function of the master clock signal generating circuit 18 in FIG. 2.

The digital data from the analog-to-digital converter unit 22a is transmitted through a transmission line 28 to a digital processing device 27. The data thus transmitted is received by a receiver 24a and is then applied to a buffer circuit 25a, the content of which has been reset with the same timing as that of the sampling frequency produced by the timing generator 29. The data of the buffer circuit 25 is clocked according to a signal of fixed frequency $f_n$ by a signal provided by a sampling signal generator 26 and loaded into the digital processing device where it is processed. The data from the sensing units 3 and 4 is synchronized in the buffer circuits 25a and 25b before being inputted to the digital processing device 27.

Error in loading the data from the sensing units 3 and 4 by the buffer circuits 25a and 25b in the above-described system will be described. It is assumed that system data extracted by the sensors 21a and 21b is represented by $y_3(t) = I_3 \sin(\omega_3 t + \theta_3)$ and $y_4(t) = I_4 \sin(\omega_4 t + \theta_4)$, respectively, and that the frequency of the timing generators 29a and 29b is $f_m$. Then, the outputs of the analog-to-digital converter units 22a and 22b are respectively as follows: $y_3(t_0)$, $y_3(t_0+1/f_m)$, $y_3(t_0+2/f_m)$, $y_3(t_0+3/f_m)$, and $y_4(t'_0)$, $y_4(t'_0+1/f_m)$, $y_4(t'_0+2/f_m)$, $y_4(t'_0+3/f_m)$, where the relation between $t_0$ and $t'_0$ is as follows because no synchronization is effected in the converter units 29a and 29b:

$$|t_0 - t'_0| \leq 1/f_m.$$

If the time difference between the time $T_3$ required for transmitting data from the data transmitting device 23a to the receiver 24a and the time $T_4$ required for transmitting data from the data transmitting device 23b to the receiver 24b is shorter than $1/f_m$, that is, if $|T_3 - T_4| < 1/f_m$, the time difference between the data arriving at the buffer circuits 25a and 25b which is sampled by the signal of frequency $f_n$ provided by the sampling signal generating circuit is only $1/f_m$ at the maximum. That is, the data from the sensing units 3 and 4 arrive at the same time so far as the digital processing device is concerned. If $f_m$ is made higher, specifically, if $1/f_m << 1$, the error due to asynchronous sampling between $y_3(t)$ and $y_4(t)'$ is:

$$y_3(t) - y_4(t) = 2 I \sin(\tfrac{1}{2}/f_m) \approx I/f_m.$$

Since $I/f_m$ can be made sufficiently small with respect to the input value I, such a small error will cause no problem as a practical matter.

Described above has been a case where sampling a plurality of parameters should be carried out simultaneously. However, in the case of using a single parameter, the sampling can be carried out completely in the same fashion as in the case of the system shown in FIG. 1.

As is apparent from comparing the conventional system and the system of the invention, in the system of the invention it is unnecessary to provide the sampling signal receivers 15a and 15b and the transmitters 17a and 17b although it is necessary to use the buffer circuits 25a and 25b. However, in the case where a number of data points are simultaneously provided from the sensing units 3 and 4, each of the buffer circuits 25a and 25b can be implemented with a random access memory and accompanying control circuit. The physical size and capacity of such a device are much smaller than the circuit elements 15a and 17a or 15b and 17b of FIG. 1. In addition, cables such as data route lines can be eliminated.

Figure 3:
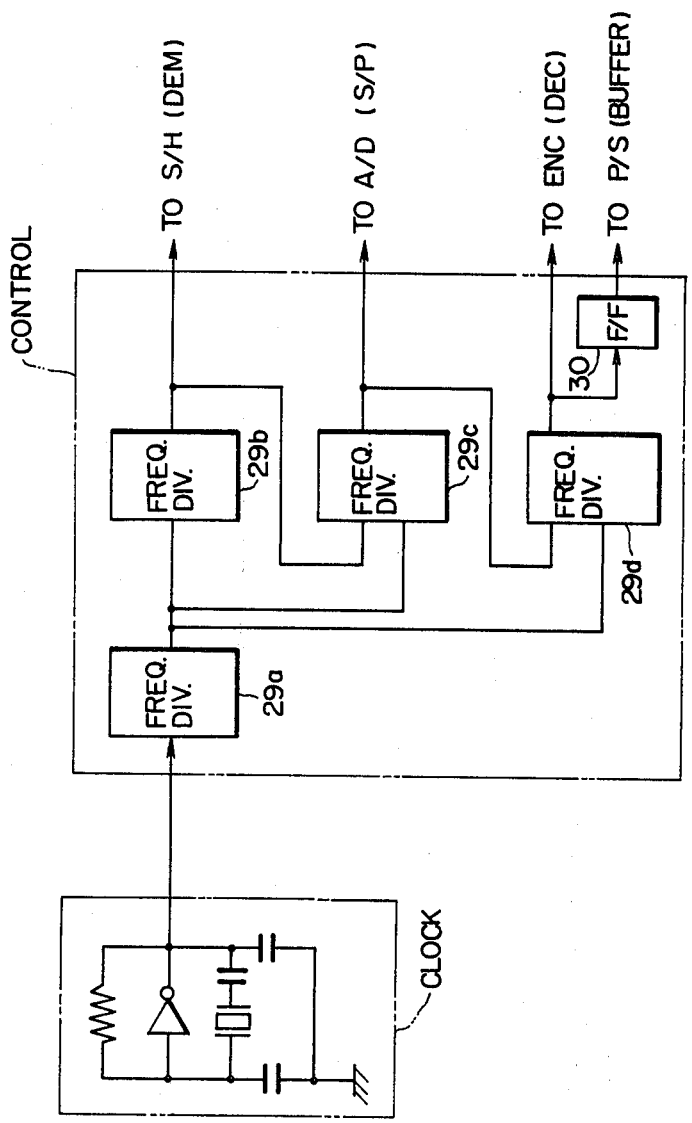
FIG. 3 is a circuit diagram of control and clock circuits used in the processing system of FIG. 2.

FIG. 3 is a block schematic diagram showing the control and clock circuits used in the embodiment shown in FIG. 2. In this circuit, the clock circuit is composed of an inverter with feedback being provided through a frequency control crystal. The circuit arrangement of the clock is itself well known and other such clock circuits, a wide variety of which are known in the prior art, can be used as desired. The control circuit includes four frequency dividers 29a–29d and a delay flip-flop 30. The frequency dividers are connected in a cascade-type arrangement. The input of the flip-flop 30 is coupled to the output of the frequency divider 29d.

It is to be noted that the circuit shown in FIG. 3 can be used for both the clock and control circuits 29a and 29b as well as the clock and control circuit 26. The connections for the latter case are indicated in FIG. 3 in parentheses. It is to further be noted that the modulator and demodulator ordinarily do not require a clock signal and that, using the circuit of FIG. 3, the clock input signals thereto can be omitted.

As is apparent from the above description, the digital data processing system according to the invention is an asynchronous sampling type digital data processing system in which the drawback of providing the synchronizing sampling signals is eliminated.

What is claimed is:

1. A digital data processing system for protecting an analog system such as an electric power system, comprising :
   a plurality of sensing units, located remotely from one another, for sensing variable parameters representative of operating conditions of said system, each of said sensing units comprising (1) means for sampling at least one of said parameters at a predetermined time interval and means for converting samples of said at least one parameter into digital data, said converting means comprising analog-to-digital converter means having a sampling frequency higher than expected variations with time of said at least one parameter; and (2) transmitting means for transmitting said digital data, said analog-to-digital converter means of each of said sensing units operating asynchronously from one another; and
   a data processing unit receiving digital data transmitted from each of said sensing units for producing control outputs for protectively controlling said analog system, said data processing unit comprising a data processing device for synchronously sampling said digital data transmitted from said sensing units and means for processing the sampled digital data in accordance with predetermined programs for producing said control outputs.

2. The digital data processing system of claim 1, wherein each of said analog-to-digital converter means in each of said sensing units comprises a sampling signal generating clock circuit and a frequency division circuit for producing sampling signals.

3. The digital data processing system of either claim 1 or claim 2, wherein said data processing unit comprises a random access memory for receiving data transmitted by said sensing units.

* * * * *